United States Patent [19]

Regenass

[11] 3,968,832
[45] July 13, 1976

[54] APPARATUS FOR CONTROLLING THE TEMPERATURE OF A HEAT EXCHANGE LIQUID

[75] Inventor: Willy Regenass, Muttenz, Switzerland

[73] Assignee: Ciba-Geigy Corporation, Ardsley, N.Y.

[22] Filed: Oct. 25, 1974

[21] Appl. No.: 517,986

[30] Foreign Application Priority Data

Nov. 2, 1973 Germany............................ 2354997

[52] U.S. Cl.................................. 165/58; 165/61
[51] Int. Cl.²........................................ F25B 7/00
[58] Field of Search ................ 165/61, 107, 27, 58

[56] References Cited
UNITED STATES PATENTS

| | | | |
|---|---|---|---|
| 3,214,937 | 11/1965 | Cannon et al. | 165/61 |
| 3,227,207 | 1/1966 | Litman | 165/27 |
| 3,259,175 | 7/1966 | Kraus et al. | 165/27 |
| 3,327,772 | 6/1967 | Kodaira | 165/61 |
| 3,578,066 | 5/1971 | Vox | 165/27 |
| 3,762,465 | 10/1973 | Gutlhuber | 165/61 |
| 3,880,227 | 4/1975 | Bauer | 165/27 |

FOREIGN PATENTS OR APPLICATIONS 676,884 6/1939 Germany ............................ 165/61

Primary Examiner—Charles J. Myhre
Assistant Examiner—James D. Liles
Attorney, Agent, or Firm—Karl F. Jorda

[57] ABSTRACT

An apparatus for controlling the temperature of a heatexchange liquid in accordance with the mixing principle, the apparatus including a centrifugal pump connected to a drive motor for conveying or circulating the liquid in a working circuit, two containers for the liquid in a shunt circuit connected via respective shutoff devices to the working circuit, means for maintaining the temperature of the liquid in one container at a given value below the temperature in the working circuit and the temperature of the liquid in the other container at a given value above the latter temperature and a mechanical propeller-like circulating means is each container, the centrifugal pump being disposed between the two containers and having a pump shaft which extends into one of the containers and piercingly extends completely through the other container and is connected to the drive motor, said motor being arranged externally of the latter container, and the propeller-like means being mounted on the two portions of the pump shaft disposed inside the containers.

11 Claims, 1 Drawing Figure

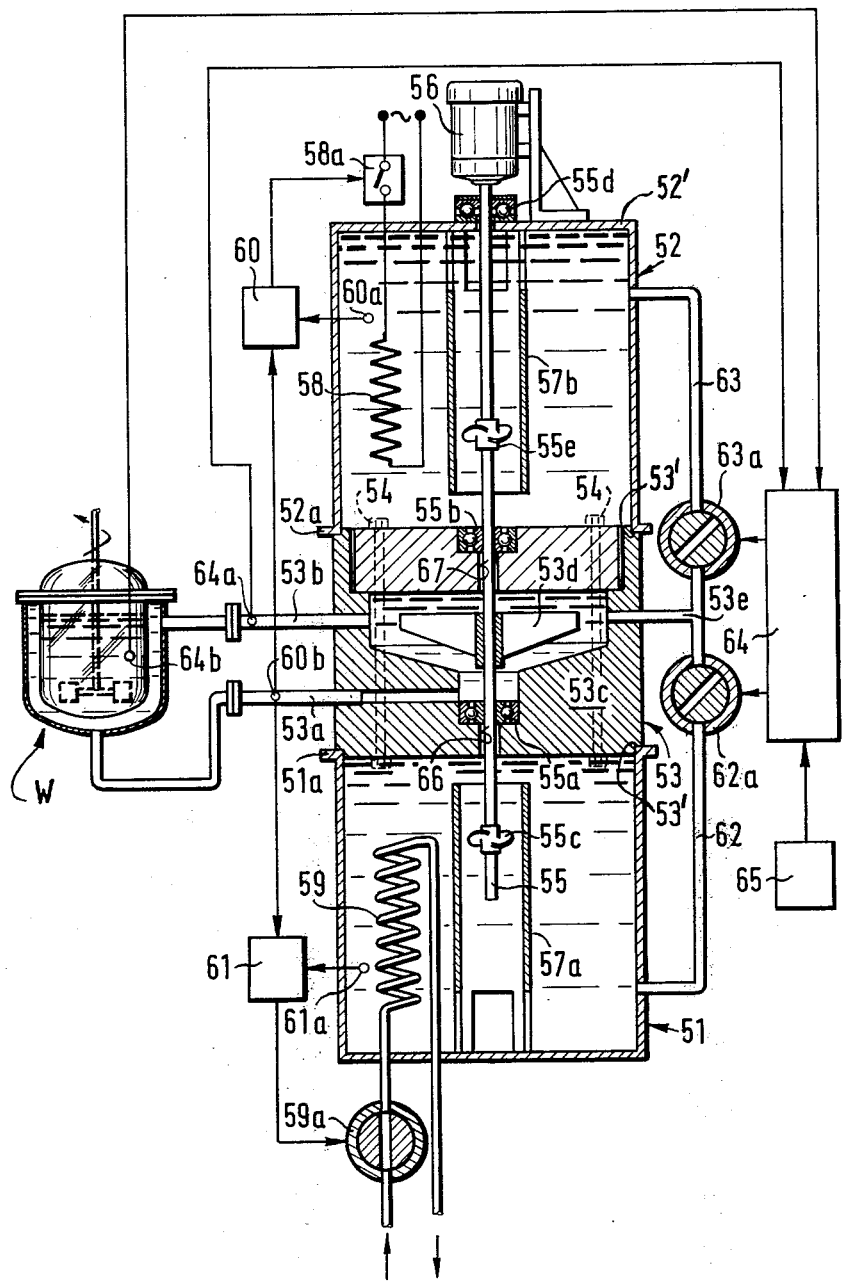

APPARATUS FOR CONTROLLING THE TEMPERATURE OF A HEAT EXCHANGE LIQUID

The invention relates to an apparatus for controlling the temperature of a heat-exchange liquid in accordance with the mixing principle, the apparatus including a centrifugal pump connected to a drive motor for conveying or circulating the liquid in a working circuit, two containers for the liquid in a shunt circuit connected via respective shut-off devices to the working circuit, means for maintaining the temperature of the liquid in the two containers at given values below or above the temperature in the working circuit, an a mechanical propeller-like circulating means in each container.

Apparatus of the aforementioned kind control the temperature very quickly and almost without delay, and more particularly are very sensitive and accurate. They are used in all cases where these special requirements are necessary, i.e. thermal measuring devices, more particularly heat flow calorimeters. It is known that, in the case of the last-mentioned devices, the quality and accuracy of the results are very closely dependent on the efficiency of the temperature control system for the heat transfer medium.

The known apparatus of this kind are excessively complex in construction and expensive. Usually the liquid containers and the pump and other structural elements are mounted independently of one another in a chassis and connected by a number of relatively long pipes and electric cables. Furthermore, a separate motor is provided for driving each of the propeller-like circulating means in the containers. Owing to this inefficient method of construction, which is equivalent to an "overhung" construction, a number of individual components are required and the apparatus is very bulky. Another disadvantageous effect is that the apparatus is relatively expensive.

One of the most important objects of the invention is to obviate these disadvantages, i.e. to provide a temperature-control apparatus, which is simple in construction, rugged, space-saving and relatively cheap.

A further object of the invention is to provide a simple and effective and accurate control system for the mixing process.

To this end, according to the present invention, the apparatus includes a centrifugal pump connected to a drive motor for conveying or circulating the liquid in a working circuit, two containers for the liquid in a shunt circuit connected via respective shut-off devices to the working circuit, means for maintaining the temperature of the liquid in one container at a given value below the temperature in the working circuit and the temperature of the liquid in the other container at a given value above the latter temperature and a mechanical propeller-like circulating means in each container, the centrifugal pump being disposed between the two containers and having a pump shaft which extends into both of said containers and is connected to the drive motor, and the propeller-like means being mounted on the two portions of the pump shaft disposed inside the containers. Preferably, the pump shaft extends into one of the containers and piercingly extends completely through the outer container and said motor is arranged externally of the latter container.

Owing to the construction according to the invention, a single drive motor and a few individual components can be used to drive the pump and the two propeller-like means in the containers.

In a particularly advantageous embodiment of the invention the two containers are each connected in parallel to the centrifugal pump, via a shut-off device. A very compact, space-saving construction can be obtained by coupling the containers to the working circuit in this manner, since only a few, relatively short pipes are required.

The pipes connecting the suction side of the pump to the containers may be completely omitted according to another embodiment of the invention, wherein the pump shaft is mounted without seals in the pump housing and the containers are connected to the suction side of the centrifugal pump via the ducts for the pump shaft through the pump housing. This embodiment has the special advantage that the pump shaft does not have to be mounted in sealing-tight manner in the pump housing and that two pipes can be omitted.

The invention will now be described in detail with reference to an embodiment shown in the drawing.

The sole FIGURE shows the apparatus of the invention partially in a cross-sectional view.

Two containers 51 and 52 for the heat transfer liquid are arranged in superimposed fashion, as shown, and intermediate thereof there is located the circulation pump which is shown, for instance, as a centrifugal pump 53. This pump 53 is connected through the agency of a respective suction-side connection 53a and pressure-side connection 53b with the circulation system of the heat transfer liquid to be controlled. In the drawing, by way of example, the pump is connected to the closed heat exchange system of a heat flow calorimeter W.

The two containers 51, 52 are used as reservoirs for a heat exchange liquid of the same kind as in the working circuit. The temperature of the liquid in the top and bottom container is greater or less than the temperature in the working circuit. The temperature in the containers is controlled by control devices to be described hereinafter.

Both of the containers 51 and 52 are of the same general construction. In the embodiment under discussion they possess a substantially cylindrical configuration with vertically extending lengthwise axes, but of course could have a different configuration, such as also a polygonal cross-sectional configuration. The housing 53c of the pump 53 is also constructed at its outer surface so as to be likewise substantially cylindrical and in this case has the same outer diameter as both of the containers 51 and 52. At the upper and lower end faces of the pump housing 53c there are suitably formed a respective annular or ring-shaped groove 53' in which there are seated the associated marginal edges of the bottomless top container 52 and the coverless lower container 51. Stated in another way both of the containers 51 and 52 are open at one respective end, but in the arrangement under discussion the end surfaces or faces of the pump housing 53c form the floor and cover of the upper container 52 and the lower container 51. The edges of the containers 51 and 52 which are seated in the annular or ring-shaped grooves 53' are equipped with a respective radially outwardly protruding flange 51a and 52a respectively. By means of these flanges both of the containers 51 and 52 are clamped together through the agency of screws 54 or equivalent fastening expedients. In this way the pump 53 is also fixedly held between both of the containers 51 and 52. Owing to the essentially equal diameter of these three superimposed and interconnected components such form a compact structural unit. To avoid any thermal losses and heat exchange between the containers via the pump the pump housing 53c is advantageously formed of a thermally insulating substance, for instance glass-fiber reinforced polytetrafluoroethylene. Additionally, this entire structural unit is enclosed by means of a not particularly illustrated envelope or shell formed of insulating material.

The pump impeller 53d of the centrifugal pump 53 is seated upon a vertical pump drive shaft 55 which is rotatably mounted at the upper and lower portion of the pump housing 53c by means of a respective radial bearing 55b and 55a. The pump shaft 55 depends downwardly into the lower container 51 and at that location carries a repulsion element, which in the illustrated embodiment comprises a propeller 55c which, during rotation of the pump shaft 55, generates an axial flow within the container 51. In similar manner the pump shaft 55 also extends upwardly and into the upper or top container 55. In this case, however, the pump shaft 55 extends through the cover 52' of such container 52 and is operatively connected with the drive shaft of a suitable drive motor 56 arranged upon such container cover 52'. An axial bearing 55d which is secured to the cover 52' secures the pump shaft 55 against axial displacement. Upon the section of the pump shaft which is located within the upper container 52 there is likewise arranged a propeller 55e or the like, and this propeller produces an axial flow at the heat transfer liquid located within the container. Owing to such flows which are produced in the containers there is obtained within such containers as uniform as possible temperature distribution. For this purpose there is also arranged in each container 51 and 52 a respective substantially cylindrical flow guide surface 57a and 57b coaxially arranged with respect to the pump shaft 55 and serving to further intensify the circulation effect.

Now in order to bring and maintain the temperature of the heat transfer medium in the upper container to the value which is required in each case for the function of the entire apparatus the container 52 is equipped with an electrical heating element 58. Furthermore, the lower container 51 is equipped with a cooling coil 59 which can be connected with any suitable and therefore not particularly illustrated source of a cooling medium or coolant. A respective regulating device 60 and 61 controls the temperature of the heat transfer liquid in the upper container 52 and the lower container 51 respectively, by actuating the electrical switch 58a and opening and closing the valve 59a respectively.

The mounting of the pump drive shaft 55 in the pump housing 53c occurs without any packing gland, in other words is not carried out so as to provide a tight seal. Therefore the internal space or compartment of the pump is continuously flow connected via the bores 66 and 67 in the pump housing, through which the pump shaft is guided, and both of the radial bearings 55a and 55b, with the lower and upper containers. The through-flow cross-sections of such connections are dimensioned such that between the inner space of the pump and the upper and lower containers there does not occur any liquid exchange brought about by convection. This can be accomplished, for instance, by carrying out an appropriately narrow dimensioning of the bores 66 and 67 or also by providing an appropriately narrow opening in the covers of the radial bearings 55a and 55b.

The pressure side of the pump 53, in other words the radially outwardly located region of the inner space of the pump, is connected via a bore in the pump housing 53c with a connection 53e at which there are connected through the agency of a branch element two conduits or lines 62 and 63, each of which is equipped with a respective shutoff or closure element 62a and 63a respectively. The conduit 62 opens into the lower portion of the lower container 51 and the conduit 63 opens into the upper portion of the upper container 52, as shown. Together with the associated container, the pump and the connection 53e, these conduits form two auxiliary or branch circulation systems for the working circulation system for the heat transfer liquid.

The mode of operation of the regulation system is as follows: During the normal condition of the system both of the valves 62a and 63a are closed. The pump 53 then circulates the heat transfer liquid only through the working circulation system. Now when the temperature in the working circulation system should increase, then, the valve 63a at the upper auxiliary or branch circulation system is opened. Consequently, a portion of the liquid which circulates in the working circulation system is branched-off through the connection or conduit 53e into the associated auxiliary or branch circulation system. This however brings about that owing to the now prevailing excess pressure in the upper container a corresponding quantity of relatively warmer liquid flows out of the upper container 52 through the radial bearing 55b into the pump 53 where at that location it admixes with the cooler circulation system liquid and finally brings about an increase of the temperature of the working circulation system.

In analogous manner for the purpose of reducing the temperature in the working circulation system the valve 62a is opened and closed. By suitably selecting the temperature differential between the liquids in the containers and in the working circulation system and by appropriately dimensioning the flow resistance in the auxiliary circulation systems it is possible to obtain an extremely rapidly reacting temperature control.

It has been found particularly advantageous, instead of keeping the temperatures of the liquids in containers 51 and 52 constant, to maintain a constant difference between the aforementioned temperatures and the temperature of the heat exchange liquid in the working circuit. To this end, both of the regulators 60 and 61 are suitably constructed and cooperate with a respective temperature feeler 60a and 61a in the containers 51 and 52 respectively, and a further temperature feeler 60b in the working circulation system, preferably arranged at the pump inlet.

Valves 62a and 63a are controlled by means of a regulation system or regulator system which cooperates with a respective temperature feeler 64a and 64b as well as a program transmitter 65. The temperature feeler 64a is arranged at the output-side pump connection 53b and the temperature feel 64b is arranged in the inner space of the reactor of the heat flow calorimeter W. The regulation system 64 compares the set temperature of the heat exchange liquid in the working circuit, as given by a set-value transmitter 65, with the actual temperature recorded by element 64a. Depending on the deviation between the actual and the set value, one or the other valve is opened or closed. The introduction of proportional amounts of relatively hot or cold liquid into the circulating heat exchange liquid must not be continuous but is preferably in the form of pulses. To this end, controller 64 is constructed so that it opens the corresponding valve 62*a* or 63*a* only for brief periods of constant duration, and only the intervals between two opening pulses are dependent on the deviation from the set value for the temperature in the working circuit. A regulating system of this kind has the advantage that control valves, which are relatively expensive can be replaced by on-off valves, which are cheaper. Of course, regulation system 64 can be differently constructed for special applications of the entire temperature control apparatus.

The temperature control apparatus for the heat transfer liquid as illustrated hereinbefore is extremely simple in construction and therefore relatively inexpensive. In particular it requires only a single drive motor for the circulation pump and both of the propellers in the containers. The individual components including the pipe conduits can be limited to a minimum and the pipe conduits also can be designed of extremely short construction. The apparatus is very compact and constitutes a space-saving unit owing to the direct connection of both containers with the pump into a unitary assembly. Due to the unique arrangement of the pump between both of the containers it is possible to save at least two pipe conduits and in particular to avoid having to use a relatively expensive sealed mounting arrangement for the pump shaft in the pump housing. The arrangement of the containers above one another and the pump drive motor upon the upper container also renders possible a glandless and therefore inexpensive mounting of the pump shaft at the cover of such container.

I claim:

1. An apparatus for controlling the temperature of a heat-exchange liquid in accordance with the mixing principle, the apparatus including a centrifugal pump connected to a drive motor for conveying or circulating the liquid in a working circuit, two containers for the liquid, each in a shunt circuit connected via respective shut-off devices to the working circuit, means for maintaining the temperature of the liquid in one container at a given value below the temperature in the working circuit, and the temperature of the liquid in the other container at a given value above the latter temperature and a mechanical propeller-like circulating means in each container, the centrifugal pump being disposed between the two containers and having a pump shaft which extends into both of said containers and is connected to the drive motor, and the propeller-like means being mounted on the two portions of the pump shaft disposed inside the containers.

2. The apparatus as defined in claim 1 wherein said pump shaft extends into one of the containers and piercingly extends completely through the other container and wherein said motor is arranged externally of the latter container.

3. The apparatus as defined in claim 1, wherein said centrifugal pump includes a pump housing having through-passages for said pump shaft, said pump shaft extending through said through-passages and being mounted without any seals in the pump housing, said centrifugal pump having a suction side and a pressure side, and wherein the containers are flow connected with the suction side of the centrifugal pump via said through-passages of the pump shaft.

4. The apparatus as defined in claim 3, wherein the pressure side of the centrifugal pump is connected with the containers by a branched pipe conduit and at each branch of said branched pipe conduit there is arranged one of said shut-off devices.

5. The apparatus as defined in claim 4, wherein the pump housing embodies a block of at least approximately the same outer cross-sectional cinfiguration as that of said containers, and means for interconnecting the containers and the pump housing into a unitary assembly.

6. The apparatus as defined in claim 5, wherein the containers are arranged above one another in superimposed fashion defining an upper container and a lower container, and the drive motor is mounted at the upper container.

7. The apparatus as defined in claim 6, wherein the pump housing is fabricated from a heat insulating material.

8. The apparatus as defined in claim 6 further including substantially cylindrical guide flow surface means which coaxially enclose the pump shaft and the propeller-like elements arranged within the containers.

9. The apparatus as defined in claim 1, further including a measuring feeler means for determining the temperature of the heat exchange liquid on the delivery side of the centrifugal pump and a regulating system cooperating with said measuring feeler means, said regulating system opening the shut-off device associated with one or the other container, depending on whether the temperature of the heat exchange liquid in the working circuit is to be increased or reduced.

10. The apparatus as defined in claim 9, wherein the means for controlling the temperature in the two containers are constructed so that the temperature of the liquid in one container is lower by a given amount and the temperature of the liquid in the other container is higher by a given amount than the temperature of the heat exchange liquid at the suction side of the pump.

11. The apparatus as defined in claim 10, wherein the regulating system opens and closes the shut-off devices by means of pulses, the ratio of the duration of an opening pulse to the interval between pulses depending on the deviation from the set value for the temperature of the working circuit.

* * * * *